United States Patent
Wu et al.

(10) Patent No.: US 10,812,624 B2
(45) Date of Patent: Oct. 20, 2020

(54) FIRMWARE/SOFTWARE OVER THE AIR (FOTA) SCHEDULING FOR CONNECTED VEHICLES

(71) Applicant: Cisco Technology, Inc., San Jose, CA (US)

(72) Inventors: Wei Wu, Los Gatos, CA (US); Hamza Dridi, Raleigh, NC (US); Grant Lynn Regan, Marietta, GA (US); Pratik Dineshkumar Gada, Milton, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/131,151

(22) Filed: Sep. 14, 2018

(65) Prior Publication Data

US 2020/0092396 A1    Mar. 19, 2020

(51) Int. Cl.
*H04L 29/08* (2006.01)
*G06F 8/65* (2018.01)
*H04W 4/02* (2018.01)
*H04W 8/24* (2009.01)
*H04W 4/40* (2018.01)
*H04W 72/12* (2009.01)

(52) U.S. Cl.
CPC ........... *H04L 67/34* (2013.01); *G06F 8/65* (2013.01); *H04L 67/12* (2013.01); *H04W 4/023* (2013.01); *H04W 4/40* (2018.02); *H04W 8/24* (2013.01); *H04W 72/121* (2013.01); *H04W 72/1289* (2013.01)

(58) Field of Classification Search
CPC ...... H04L 41/12; H04L 2209/80; H04W 4/44; H04W 4/46; H04W 4/50; G06F 8/65
See application file for complete search history.

(56) References Cited

U.S. PATENT DOCUMENTS

| | | | |
|---|---|---|---|
| 9,715,378 B2 | 7/2017 | Dickerson et al. | |
| 9,946,531 B1* | 4/2018 | Fields | A61B 5/6893 |
| 2010/0082559 A1 | 4/2010 | Sumcad et al. | |
| 2011/0125509 A1 | 5/2011 | Lidstrom et al. | |
| 2016/0364225 A1* | 12/2016 | Moeller | G06F 16/24568 |
| 2017/0344355 A1* | 11/2017 | Sarkar | G06F 8/65 |
| 2017/0374668 A1* | 12/2017 | Tran | H04W 72/0486 |

(Continued)

OTHER PUBLICATIONS

Azizian et al. "Vehicle Software Updates Distribution with SDN and Cloud Computing," in IEEE Communications Magazine, vol. 55, No. 8, pp. 74-79, Aug. 2017 Retrieved on [Jun. 4, 2020] Retrieved from the Internet:URL<https://ieeexplore.ieee.org/stamp/stamp.jsp?tp=&arnumber=8004158> (Year: 2017).*

(Continued)

Primary Examiner — S. Sough
Assistant Examiner — Cheneca Smith
(74) Attorney, Agent, or Firm — Behmke Innovation Group LLC; Kenneth J. Heywood; Jonathon P. Western

(57) ABSTRACT

In one embodiment, a service obtains wireless network connectivity data for a plurality of vehicles. The service clusters the plurality of vehicles into clusters based on the network connectivity data. The service determines an update schedule for the plurality of vehicles by assigning the clusters to timeslots of the schedule. The service pushes a firmware or software update to the vehicles according to the update schedule.

17 Claims, 6 Drawing Sheets

(56) References Cited

U.S. PATENT DOCUMENTS

2018/0176329 A1* 6/2018 Chen ............... H04L 67/06
2019/0278581 A1* 9/2019 Miller .............. G06F 8/65

OTHER PUBLICATIONS

Andrade, et al., "Managing Massive Firmware-Over-The-Air Updates for Connected Cars in Cellular Networks", CarSys'17, Oct. 20, 2017, Snowbird, Utah., 2017, 8 pages, ACM.
Andrade, et al., "Scheduling software updates for connected cars with limited availability", AT&T Labs Research, Oct. 16, 2017, 49 pages, 2017, AT&T Intellectual Property.

* cited by examiner

FIRMWARE/SOFTWARE OVER THE AIR (FOTA) SCHEDULING FOR CONNECTED VEHICLES

TECHNICAL FIELD

The present disclosure relates generally to computer networks, and, more particularly, to firmware/software over the air (FOTA) scheduling for connected vehicles.

BACKGROUND

Many vehicles, such as automobiles, are becoming increasingly sophisticated in terms of on-board sensors, sensor data processing, and overall vehicle capabilities. For example, autonomous vehicles, also sometimes referred to as self-driving cars, may leverage complex sensors and data processing techniques, to route the vehicles to their destinations and avoid roadway hazards. Trials of autonomous vehicles are now being conducted in many cities.

With the increasing computerization of vehicles also comes an increasing push to connect vehicles to other systems (V2X). For example, vehicle to vehicle (V2V) communications allows nearby vehicles to share data between one another, such as detected hazards, coordinating platoons of autonomous vehicles that travel together in unison, and the like. Similarly, vehicle to infrastructure (V2I) communications allow vehicles to communicate with existing computer networks, such as the Internet. By connecting vehicles to the existing infrastructure, it becomes possible to manage and monitor large numbers of vehicles at once. For example, a central traffic service could potentially route vehicles in a city, so as to minimize traffic in the city (e.g., by load balancing the vehicle traffic along the different roads).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
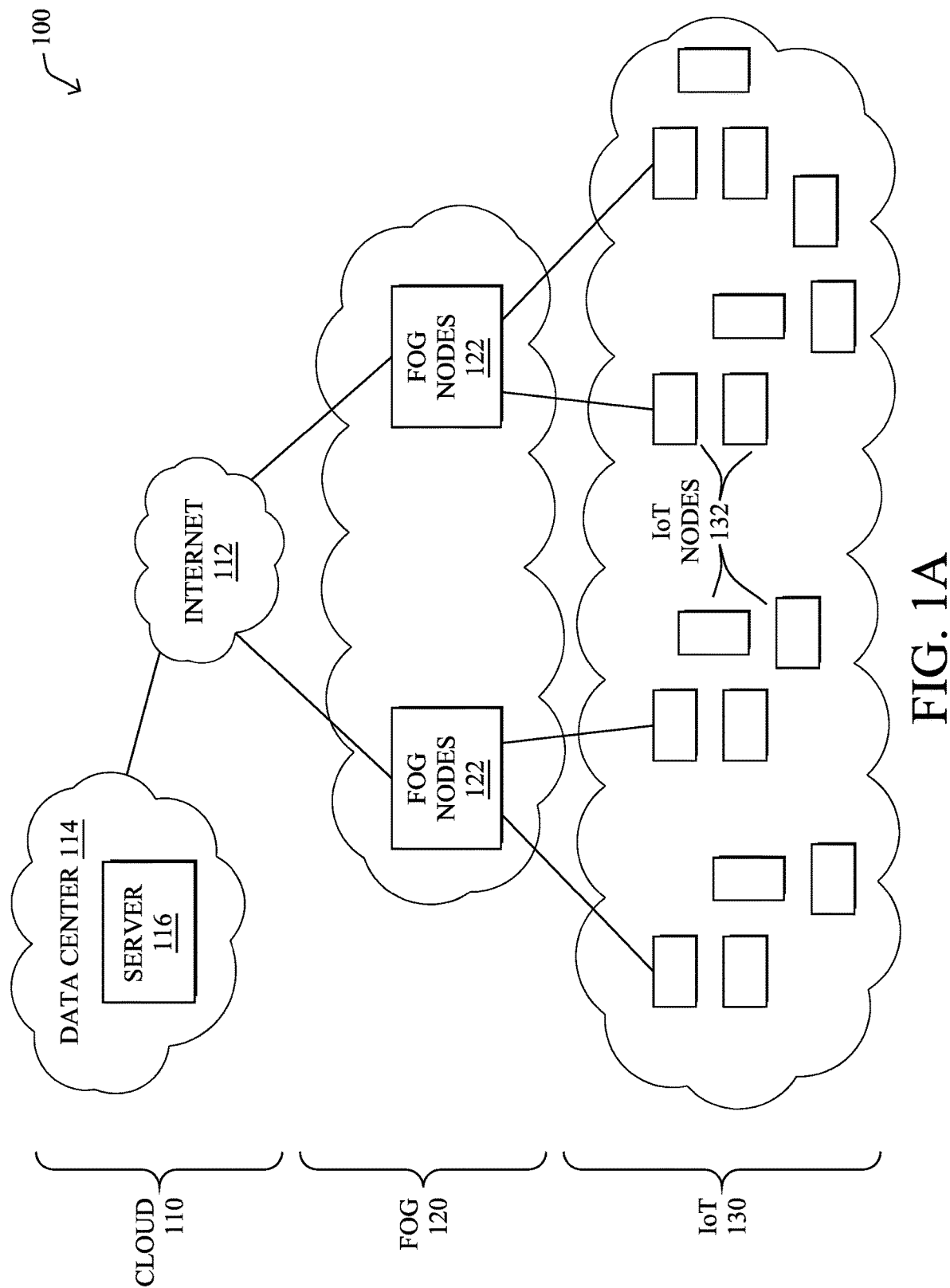
FIGS. 1A-1B illustrate an example communication network.

According to one or more embodiments of the disclosure, a service obtains wireless network connectivity data for a plurality of vehicles. The service clusters the plurality of vehicles into clusters based on the network connectivity data. The service determines an update schedule for the plurality of vehicles by assigning the clusters to timeslots of the schedule. The service pushes a firmware or software update to the vehicles according to the update schedule.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh network, such as wireless or PLC networks, etc., and are often on what is referred to as Low-Power and Lossy Networks (LLNs), which are a class of networks in which both the routers and their interconnects are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to IoT endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1A is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, Power Line Communications (PLC) protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 1B:
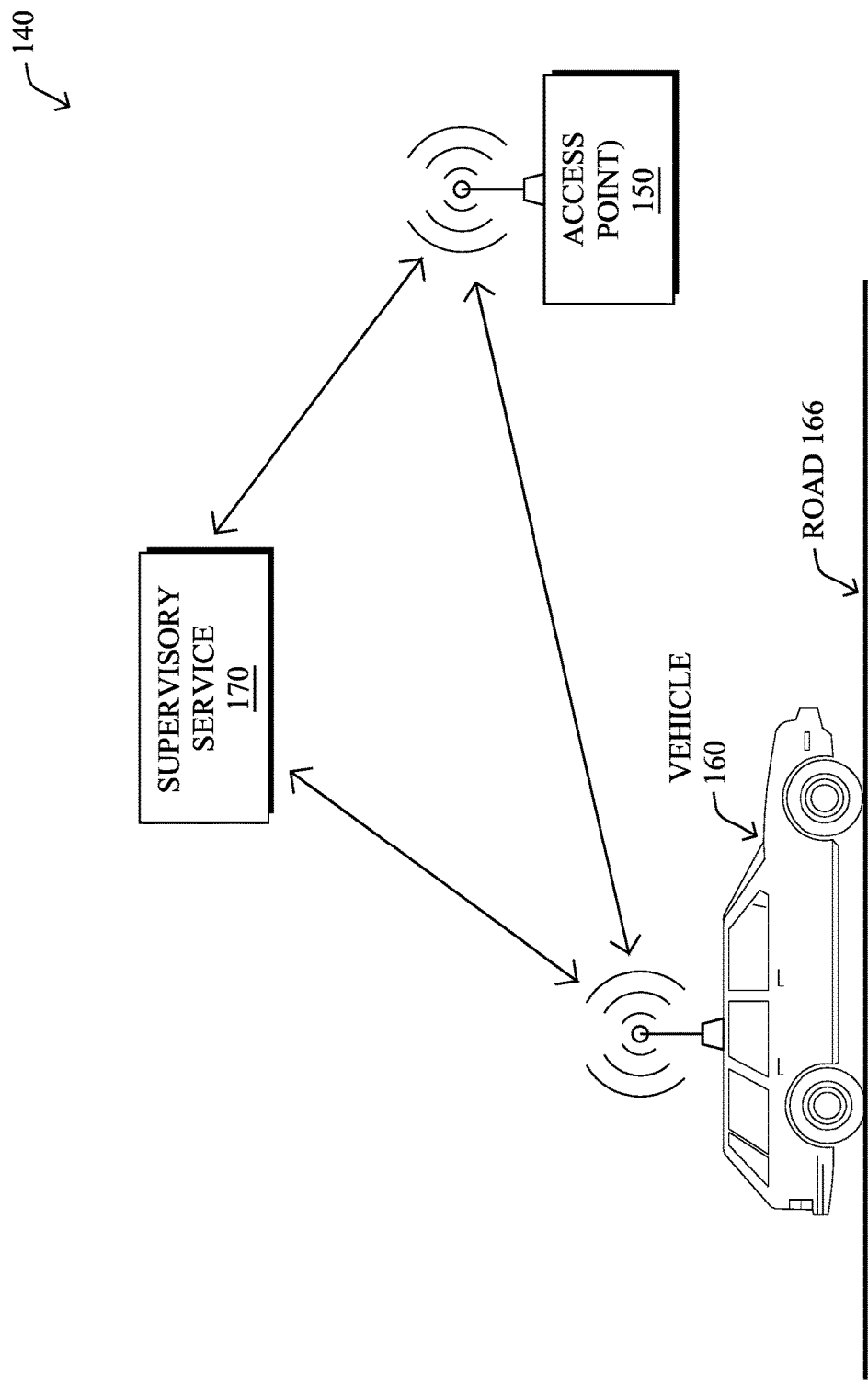

FIG. 1B illustrates an example connected vehicle system 140, according to various embodiments. In particular, connected vehicle system 140 may include any or all of the following components: a vehicle 160, an access point 150, and/or a remote supervisory service 170. During operation, connected vehicle system 140 may be operable to interface vehicle 160 with a backend computer network, such as the Internet, to which supervisory service 170 belongs.

In some embodiments, connected vehicle system 140 may be a specific implementation of communication network 100. Notably, supervisory service 170 may be implemented at the cloud layer 110, such as at a particular server 116 in a data center 114 or, alternatively, across multiple servers 116, such as part of a cloud-based service. Similarly, access point 150 may be a fog node 122 at fog computing layer 120, while vehicle 160 may be viewed as an IoT node 132 at IoT layer 130. Thus, vehicle 160 may communicate directly with access point 150, and/or via other IoT nodes 132 (e.g., other vehicles, roadside sensors, etc.), and access point 150 may provide some degree of processing or storage over the communicated data.

Generally, as shown, vehicle 160 may be an automobile, motorcycle, truck, aircraft, autonomous drone, or any other type of vehicle configured to communicate via connected vehicle system 140. In some embodiments, vehicle 160 may be a fully autonomous vehicle or a semi-autonomous vehicle that allows a driver to exert control over vehicle 160, as desired.

Access point 150 may communicate with supervisory service 170 via a WAN, such as the Internet 112 or another WAN. For example, access point 150 may communicate with supervisory service 170 by leveraging a hardwired network connection, cellular or other wireless connection, satellite connection, or the like. Communications between vehicle 160 and access point 150 may generally be wireless and use any form of known wireless communication (e.g., Wi-Fi, cellular, light-based, etc.). More specifically, access point 150 may be part of a radio access network that provides wireless connectivity between a backbone network and vehicle 160.

As would be appreciated, vehicle 160 may comprise its own local network, to allow the various components of vehicle 160 to communicate with one another. For example, vehicle 160 may comprise a controller area network (CAN) bus, IP network, or the like, to allow the various systems of vehicle 160 to communicate with one another. Such system may include, but are not limited to, an engine control unit (ECU), a battery management system (BMS) that manages the local battery of vehicle 160, if vehicle 160 is an electric vehicle, processors controlling vehicle body functions, and the like. A local gateway of vehicle 160 may provide communicative connectivity between the local network of vehicle 160 and other devices.

Figure 2:
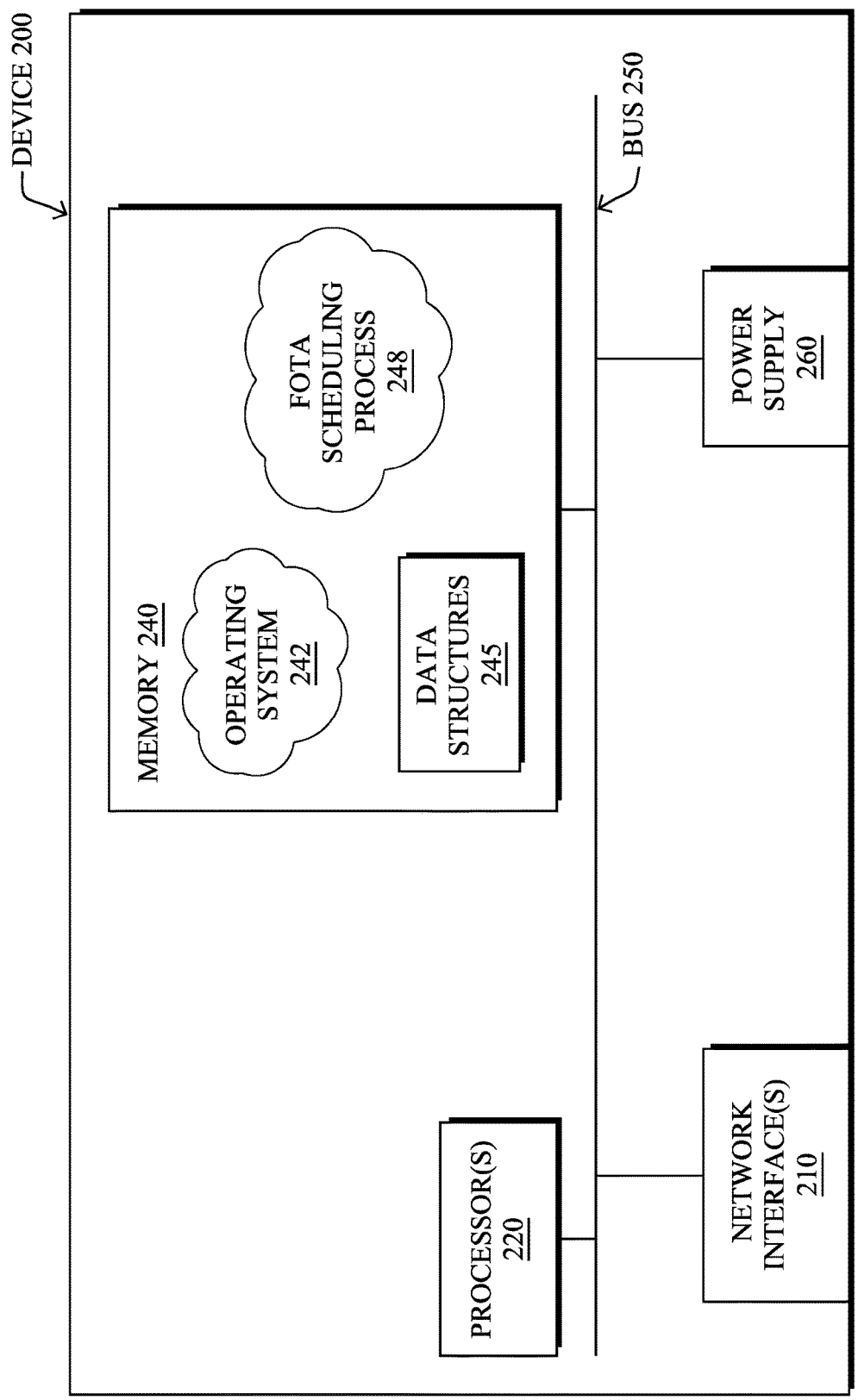
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative firmware/software over the air (FOTA) scheduling process 248, as described herein.

In general, FOTA scheduling process 248 may be configured to schedule the updating of the software or firmware of connected vehicles. In some embodiments, FOTA scheduling process 248 may do so by leveraging machine learning, to schedule the FOTA updates. In general, machine learning is concerned with the design and the development of techniques that take as input empirical data and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, FOTA scheduling process 248 may employ one or more supervised, unsupervised, or semi-supervised machine learning models. Generally, supervised learning entails the use of a training set of data, as noted above, that is used to train the model to apply labels to the input data. For example, the training data may include data indicative of the connectivity of the various vehicles. On the other end of the spectrum are unsupervised techniques that do not require a training set of labels. Notably, while a supervised learning model may look for previously seen patterns that have been labeled, as such, an unsupervised model may instead look to whether there are sudden changes in the behavior. Semi-supervised learning models take a middle ground approach that uses a greatly reduced set of labeled training data.

Example machine learning techniques that FOTA scheduling process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes, or operate concurrently.

As noted above, vehicles are becoming increasingly sophisticated and many vehicles today are connected vehicles capable of communicating wirelessly via the Internet. With these increased capabilities also comes the requirement that the software and firmware of the connected vehicles, from time to time. For example, a vehicle manufacturer may provide firmware/software over the air (FOTA) updates to its vehicles over time. Typically, these FOTA update campaigns also need to be completed within a very limited amount of time (e.g., on the order of days or weeks), depending on the criticality of the update.

Because of power limitations in the head unit batteries of vehicles, vehicle manufacturers typically design their FOTA updates to occur when a vehicle is powered on (and potentially active on the road). Accordingly, vehicle manufacturers often trigger FOTA updating as soon as a vehicle becomes available on the network. However, doing so fails to take into account the potential network congestion that would result. For example, many vehicles come online during morning and evening communing hours, which could result in the FOTA update causing a large traffic surge in the wireless and core networks used to push the update to the vehicles, during these times. As another example, it is possible that a user of the vehicle may reject the FOTA push as scheduled for various reasons. Therefore, in addition to the vehicle connectivity pattern, such user behavior data may also be collected as the inputs for the machine learning algorithms used by the FOTA scheduler to determine the optimal FOTA schedule.

Firmware/Software Over the Air (FOTA) Scheduling for Connected Vehicles

The techniques herein allow for the intelligent scheduling of a FOTA update campaign to connected vehicles in a way that optimally distributes the FOTA traffic and optimizes network resource usage. In some aspects, machine learning is leveraged (e.g., clustering, etc.) to identify connected vehicle connectivity/activity patterns based on connectivity data from the wireless network, such as charging data records (CDRs) or the like.

Specifically, according to one or more embodiments of the disclosure as described in detail below, a service obtains wireless network connectivity data for a plurality of vehicles. The service clusters the plurality of vehicles into clusters based on the network connectivity data. The service determines an update schedule for the plurality of vehicles by assigning the clusters to timeslots of the schedule. The service pushes a firmware or software update to the vehicles according to the update schedule.

Illustratively, the techniques described herein may be performed by hardware, software, and/or firmware, such as in accordance with the FOTA scheduling process 248, which may include computer executable instructions executed by the processor 220 (or independent processor of interfaces 210) to perform functions relating to the techniques described herein.

Figure 3:
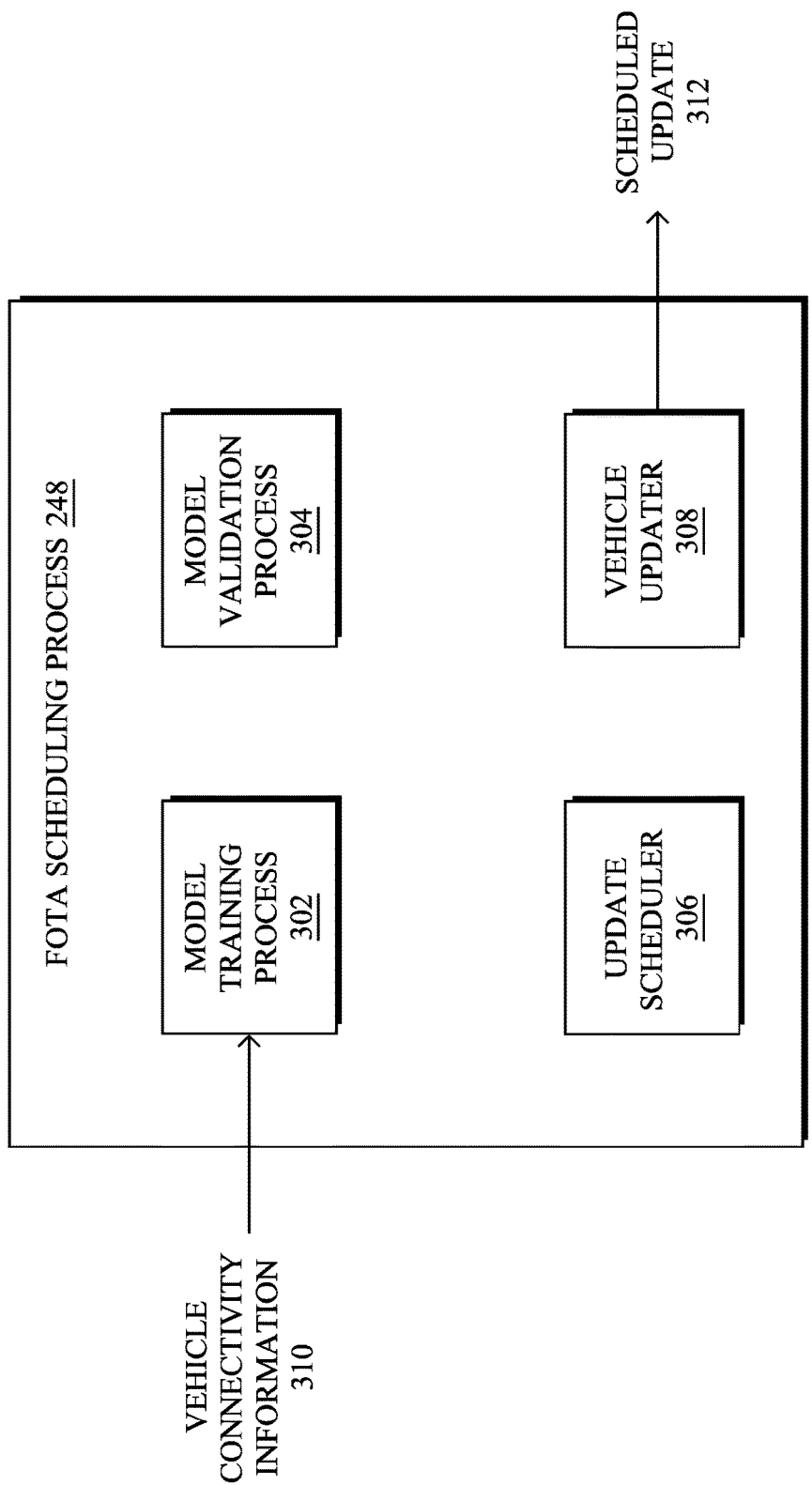
FIG. 3 illustrates an example architecture for scheduling firmware or software updates for connected vehicles.

Operationally, FIG. 3 illustrates an example architecture 300 for scheduling firmware or software updates for connected vehicles. As shown, FOTA scheduling process 248 may include any or all of the following components/sub-processes: a model training process 302, a model validation process 304, an update scheduler 306, and a vehicle updater 308. Accordingly, the components 302-308 shown may be implemented on a device (e.g., device 200) or in a distributed manner across any number of devices which can, in turn, also be viewed as a singular executing device. In one embodiment, FOTA scheduling process 248 may be implemented as a cloud-based service that oversees the scheduling and downloading of a firmware or software update to vehicles (e.g., supervisory service 170 in FIG. 1B. In addition, the functionalities of the components of architecture 300 may be combined, omitted, or implemented as part of other processes, as desired.

As noted, connected vehicles may communicate wirelessly with a communication network, such as a cellular network, satellite network, or the like. In many cases, the existing network may generate charging data records (CDRs) or other connectivity data that captures the various activities of the connected vehicles on the wireless network. A CDR is typically created by the network (e.g., a Packet Gateway in the cellular network case) for various causes, which include, but not limited to, (1) data session is over, (2) data volume exceeds a preconfigured threshold (e.g., 100 Mbytes), (3) data session duration exceeds a preconfigured timer (e.g., 24 hours), (4) the device changes network attachment. For example, a set of CDRs for a particular connected vehicle may indicate when the vehicle establishes or tears down connections to the network (i.e., when the data session is over), performs handovers (i.e., when the vehicle changes network attachment), and/or uses the network for various services (e.g., music streaming, phone calls, etc.) (e.g., flow-based CDR or when the streaming data volume exceeds, e.g., 100 Mbytes). In many cases, the data records for a vehicle also indicate timing information for the various activities of the vehicle, such as the times during which the vehicle was connected to the network (e.g., active hours during the day, active days of the week, etc.), data session duration, etc. The data records for the vehicle may also indicate the locations of the vehicle associated with the various actions of the vehicle with respect to the wireless network.

In various embodiments, as detailed below, model training process 302 can use vehicle connectivity information 310 from the wireless network to model the connectivity patterns of the various vehicles to receive the firmware or software update via the wireless network. In turn, update scheduler 306 may use the modeled connectivity patterns of the vehicles to assign the vehicles to timeslots of the FOTA schedule, such as during their optimal download times predicted by their connectivity models. In some embodiments, machine learning methods, such as clustering, can be used to assign vehicles with similar connectivity patterns to the same group of timeslot(s) in the schedule.

As shown, model training process 302 may obtain vehicle connectivity information 310, such as CDRs or the like, either on a push or pull basis from the wireless network that is to deliver the FOTA updates. In general, vehicle connectivity information 310 for a particular vehicle may include information regarding any or all of the following:

- A unique identifier for the device—e.g., an International Mobile Subscriber Identity (IMSI), a media access control (MAC) address, etc.
- The activities of the vehicle with respect to the wireless network—e.g., connecting to the network, disconnecting from the network, participating in a handoff between access points (e.g., between cell towers, etc.), sending or receiving certain types of traffic (e.g., voice calls, media streaming, etc.), or the like.
- Timing information regarding the activities of the vehicle on the wireless network—e.g., timestamp information regarding when the vehicle connected to the network, when the vehicle disconnected from the network, duration information, etc. Note that duration information may be explicit in vehicle connectivity information 310 or may be
- Location information regarding the activities of the vehicle—e.g., whether the vehicle was at a set location, whether the vehicle was moving along a particular route, signal-to-noise ratio of the given route (i.e. power quality of signal strength), etc.

According to various embodiments, model training process 302 may apply machine learning to vehicle connectivity data 310, to model the connectivity behaviors of the various vehicles that are to receive the firmware or software update. In one embodiment, model training process 302 may apply a machine learning-based clustering approach to vehicle connectivity data 310, to form clusters of vehicles that exhibit similar network connectivity patterns. For example, the output of such a clustering mechanism may be the device ID of the vehicle (e.g., IMSI, etc.), a group identifier that identifies the cluster/group of similarly behaving vehicles to which the vehicle belongs, and/or the connectivity pattern(s) of the vehicles in the cluster.

By way of example, assume that a subset of the vehicles that are to receive the update are owned by people that typically work second shift, e.g., between 3:00 PM and 11:00 PM. Accordingly, their respective vehicles may not typically be connected to the wireless network during first shift commuting hours (e.g., 7:00-9:00 AM, 4:00-6:00 PM), but are instead connected during second shift commuting hours (e.g., 2-3:00 PM, 11:00 PM-12:00 AM). Based on the connectivity information for these vehicles, model training process 302 may assign these vehicles to a vehicle cluster.

In some embodiments, model validation process 304 may validate and refine the model(s) generated by model training process 302. In one embodiment, model validation process 304 may operate in conjunction with model training process 302 by splitting vehicle connectivity information 310 into two datasets: 1.) a training dataset that model training process 302 uses for model training and 2.) a validation dataset that model validation process 304 uses to validate the trained model from model training process 302. For example, assume that model training process 302 assigns a particular vehicle to a vehicle cluster that is associated with network connectivity between 5:00 AM-6:00 AM on Tuesday mornings. To validate this, model validation process 304 may assess further connectivity records for that vehicle, to verify whether this cluster assignment was correct.

If the results of the validation by model validation process 304 are below an acceptable threshold, such as in terms of precision or recall, model validation process 304 may trigger retraining of the model by model training process 302. For example, model validation process 304 may trigger model training process 302 to use a different set of vehicle connectivity records from information 310 for purposes of model training.

In various embodiments, update scheduler 306 may assign vehicles to timeslots of the schedule for the FOTA update. For example, in some cases, the FOTA update may have a limited time window during which the update should be pushed to the full set of vehicles (e.g., updates should be completed within the span of a week, etc.). Based on the modeled behaviors of the vehicles in terms of connectivity to the wireless network, update scheduler 306 may schedule the updates for particular vehicles to optimize the likelihood of update delivery and/or to optimize the load on the wireless network. For example, update scheduler 306 may schedule delivery of the firmware or software update during a particular timeslot to the vehicles in a particular vehicle cluster, if the cluster indicates that those vehicles are likely to be connected to the network during the assigned timeslot.

In some embodiments, update scheduler 306 may also assign vehicles to timeslots of the update schedule, to take into account the resulting impact on the resources of the wireless network. For example, assume that two clusters of vehicles are both likely to be connected to the network during the same timeslot. Rather than assign both clusters to this timeslot, update scheduler 306 may instead assign only one of the clusters of vehicles to this timeslot and the other cluster to a different timeslot, which may be the next optimal time slot according to the vehicles' connectivity pattern(s), so as to better load balance the updates across the timeslots of the update schedule.

Vehicle updater 308 may be configured to push a given FOTA update 312 to the target connected vehicles, according to the schedule determined by update scheduler 306. For example, if a particular vehicle is assigned to the 5:00-6:00 PM timeslot on Tuesday, vehicle updater 308 may push the firmware or software update to the vehicle during this timeslot. As would be appreciated, such an update may occur when the vehicle itself is stationary (e.g., parked in a garage or on a lot, etc.) or, in some cases, while the vehicle itself is in motion. In one embodiment, the assignment of a vehicle to a timeslot may also take into account the predicted path of travel of the vehicle (e.g., to avoid handoffs between access points, to avoid potential losses of connectivity during the update, etc.).

In some embodiments, FOTA scheduling process 248 may employ a feedback loop, to update the scheduling of updates for the various target vehicles over time. For example, model training process 302 may update the vehicle connectivity models for the vehicles periodically, continuously, or on demand, based on new vehicle connectivity information 310. In some embodiments, this re-training may also take into account any update failures that occur during a FOTA update campaign. For example, if a vehicle was not connected to the wireless network during its scheduled FOTA update time, this may trigger model training process 302 to re-evaluate the cluster assignment of that vehicle.

Figure 4:
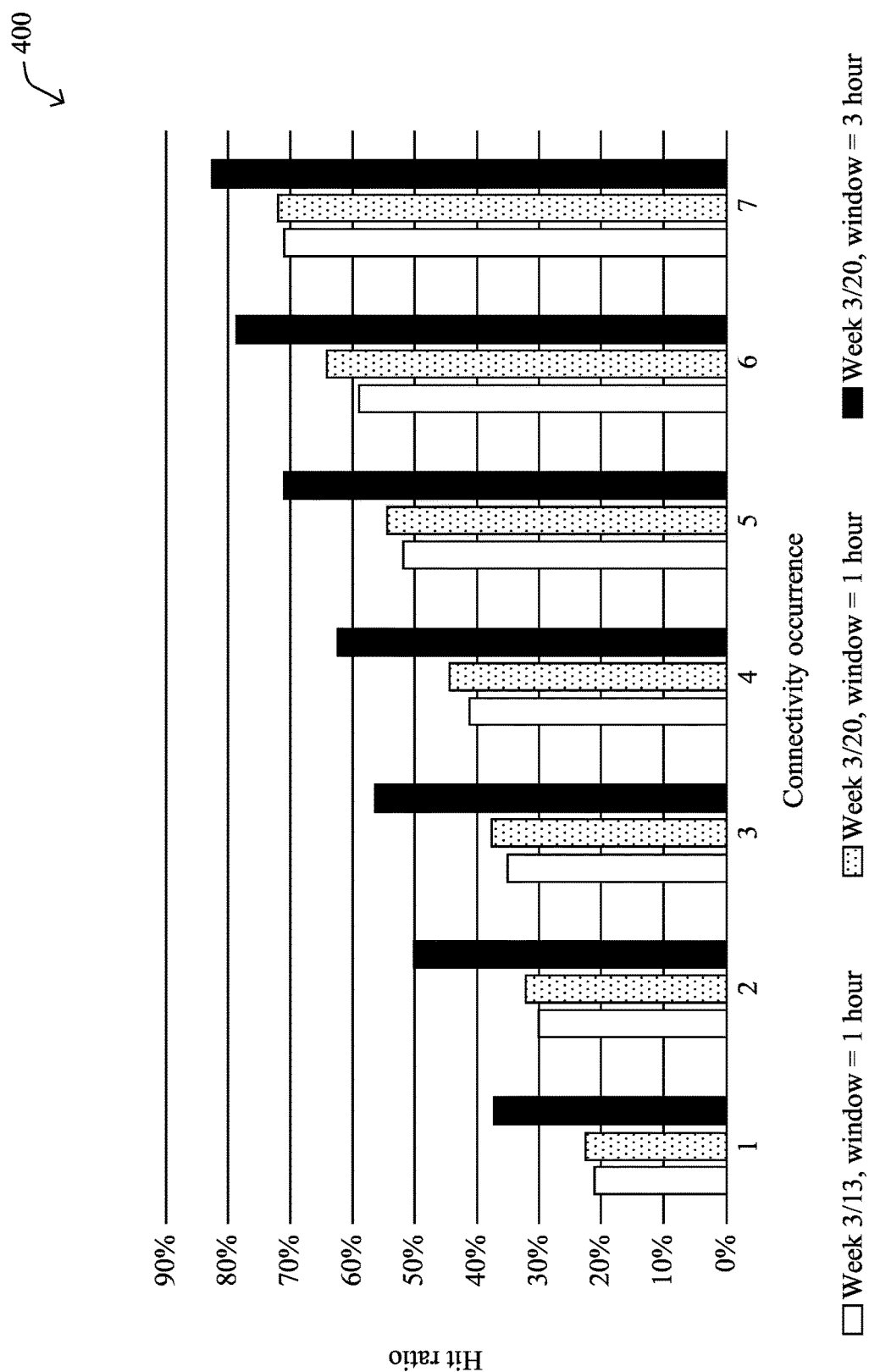
FIG. 4 illustrates an example plot of scheduling hit ratios.

Preliminary testing of the techniques herein indicates the efficacy of predicting vehicle connectivity for purposes of scheduling FOTA updates. For example, a test was conducted for scheduling updates to 2,649 vehicles, the results of which are show in plot 400 in FIG. 4. During the test, the modeled connectivity for each vehicle was compared against its actual connectivity during each of the following time periods: 1.) a one hour window during the week of March 13$^{th}$, 2.) a one hour window during the week of March 20$^{th}$, and 3.) a three hour window during the week of March 20$^{th}$. From this, the aggregate hit ratios for the vehicles were calculated and included in plot 400.

Several observations can be made from plot 400. First, plot 400 demonstrates that vehicle connectivity can be predicted based on its past connectivity to the wireless network. Second, the scheduling hit ratio for a given vehicle is approximately proportional to its connectivity consistency (e.g., the greater the connectivity occurrences, the higher the hit rate). Third, the scheduling hit ratio also increases with the time window for validation/updating (e.g., a three hour time window has a higher hit ratio than a one hour window).

Preliminary testing of the techniques herein were performed to compare FOTA scheduling using the techniques herein to blindly pushing a FOTA update at the beginning of the week to vehicles. From this testing, it was noted that the peak traffic load during the FOTA update that did not take into account vehicle connectivity patterns was approximately five times that of the FOTA update that took these patterns into account during scheduling.

Figure 5:
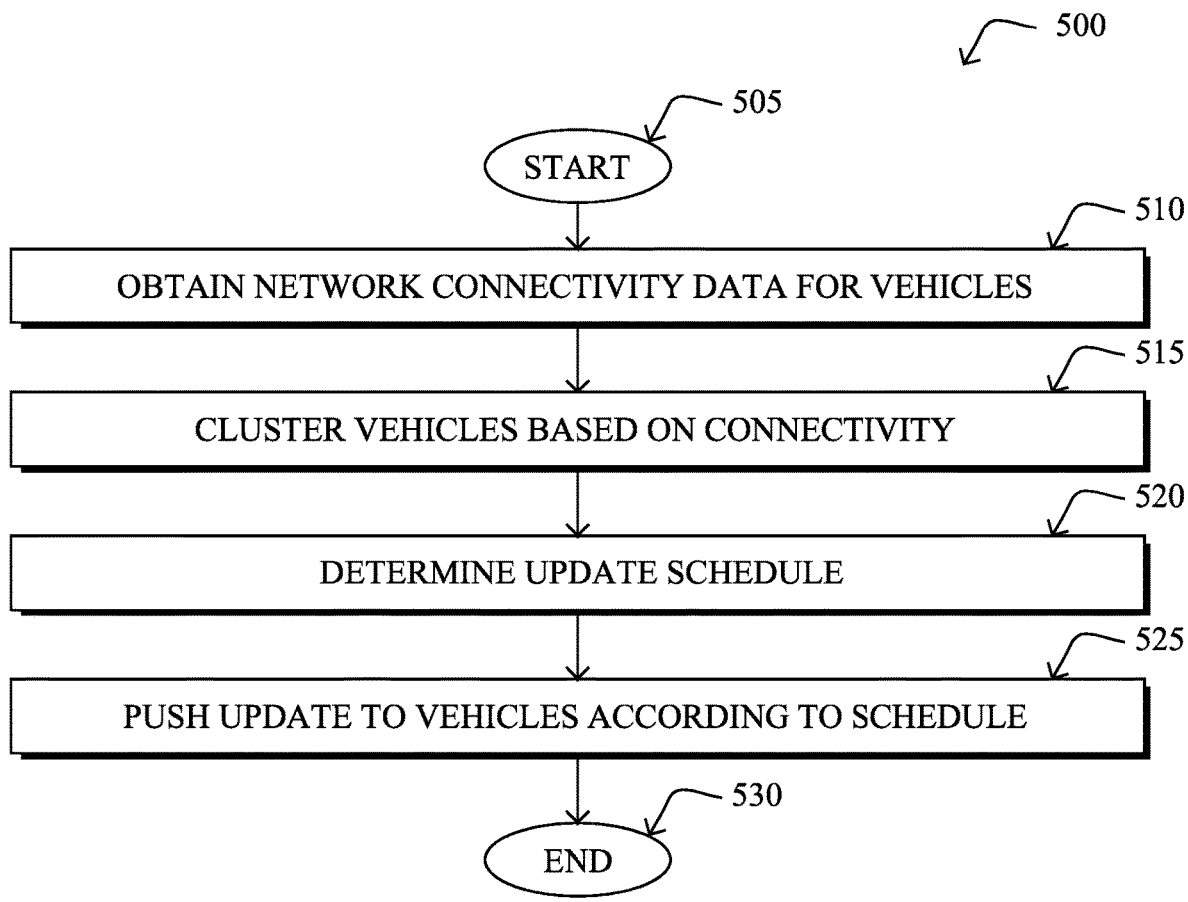
FIG. 5 illustrates an example simplified procedure for scheduling vehicle updates.

FIG. 5 illustrates an example simplified procedure for scheduling vehicle updates in a wireless network, in accordance with one or more embodiments described herein. For example, a non-generic, specifically configured device (e.g., device 200) may perform procedure 500 by executing stored instructions (e.g., process 248). The procedure 400 may start at step 505, and continues to step 510, where, as described in greater detail above, the device may obtain wireless network connectivity data for a plurality of vehicles. For example, if the wireless network is a cellular network, the connectivity data may comprise charging data records (CDRs) indicative of connectivity of the vehicles to the network. In general, the connectivity data may indicate when a given vehicle was connected to the network, as well as identifying the vehicle (e.g., by IMSI). In further cases, the connectivity data may be more comprehensive, such as also indicating the type of activity on the network, the location(s) of the vehicle during the activities, connectivity signal strength, and the like.

At step 515, as described in greater detail above, the device may cluster the plurality of vehicles into clusters based on the network connectivity data. In various embodiments, the device may use machine learning-based clustering, to assign a vehicle to a cluster of vehicles that exhibit the network connectivity pattern as that of the vehicle. For example, the vehicles in a given cluster may all connect to the wireless network, as well as disconnect from the network, within the same or similar time frames. Further input for the machine learning could also be whether the users of the vehicles accepted or rejected FOTA updates and, if so, when.

At step 520, the device may determine an update schedule for the plurality of vehicles by assigning the clusters to timeslots of the schedule, as described in greater detail above. In some embodiments, the device may assign the vehicles to timeslots, so as to maximize an estimated number of vehicles that will receive the update within a predefined period of time. In other words, the device may assign a vehicle to an update timeslot that corresponds to when the vehicle is likely to be connected to the network. In further embodiments, the device may assign vehicles to timeslots of the schedule in a manner that load balances the FOTA updates over time for the network.

At step 525, as detailed above, the device may push a firmware or software update to the vehicles according to the update schedule. For example, if the device stores the update locally, it may send the update to the vehicles during their scheduled timeslots. Similarly, if the update is stored externally from the device, the device may push the update to the vehicles by instructing the storing device to send the update to the vehicles at their assigned times. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for an intelligent scheduling mechanism for sending FOTA updates to connected vehicles, such as automobiles, trains, planes, boats, or the like, or even certain non-vehicle devices. In some aspects, the techniques herein leverage machine learning, to model and predict the times during which a vehicle may be connected to a wireless network, such as a cellular network. By leveraging this connectivity model, the techniques herein allow for the FOTA updates to be spread out over a period of time, so as to reduce the load on both the wireless network, as well as the backend network providing the update.

While there have been shown and described illustrative embodiments that provide for FOTA update scheduling for connected vehicles, it is to be understood that various other adaptations and modifications may be made within the spirit and scope of the embodiments herein. For example, while certain embodiments are described herein with respect to using certain models for purposes of predicting vehicle connectivity, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   obtaining, by a service, wireless network connectivity data for a plurality of vehicles;
   clustering, by the service, the plurality of vehicles into clusters using a machine learning-based model, wherein the machine learning-based model is trained using a first subset of the network connectivity data;
   validating, by the service, the clustering of the plurality of vehicles based on an assessment of the first subset of the network connectivity data for a particular vehicle of the plurality of vehicles;
   determining that a result of the validation of the clustering fails to satisfy a threshold;
   re-training, by the service, the machine learning-based model using a second subset of the network connectivity data different from the first subset of the network connectivity data;
   clustering, by the service, the plurality of vehicles into clusters using the re-trained machine learning-based model;
   determining, by the service, an update schedule for the plurality of vehicles by assigning the clusters to timeslots of the schedule; and
   pushing, by the service, a firmware or software update to the vehicles according to the update schedule.

2. The method as in claim 1, wherein the machine learning-based model uses a record of previously accepted or rejected firmware or software updates as input.

3. The method as in claim 1, wherein the network connectivity data comprises charging data records (CDRs) indicative of activity of the vehicles relative to a cellular network.

4. The method as in claim 1, further comprising:
   dividing the network connectivity data into a training dataset and a validation dataset;
   using the training dataset to train the machine learning-based model that models network connectivity of the vehicles; and
   using the validation dataset to validate the trained machine learning-based model.

5. The method as in claim 4, further comprising:
   updating, by the service, the machine learning-based model using new network connectivity data.

6. The method as in claim 1, wherein determining the update schedule for the plurality of vehicles comprises:
   assigning the vehicles to timeslots of the schedule, to maximize an estimated number of vehicles that will receive the update within a predefined period of time.

7. An apparatus, comprising:
   one or more network interfaces to communicate with a network;
   a processor coupled to the network interfaces and configured to execute one or more processes; and
   a memory storing a process executable by the processor, the process when executed configured to:
   obtain wireless network connectivity data for a plurality of vehicles;
   cluster the plurality of vehicles into clusters using a machine learning-based model, wherein the machine learning-based model is trained using a first subset of the network connectivity data;
   validate the clustering of the plurality of vehicles based on an assessment of the first subset of the network connectivity data for a particular vehicle of the plurality of vehicles;
   determine that a result of the validation of the clustering fails to satisfy a threshold;
   re-train the machine learning-based model using a second subset of the network connectivity data different from the first subset of the network connectivity data;
   cluster the plurality of vehicles into clusters using the re-trained machine learning-based model;
   determine an update schedule for the plurality of vehicles by assigning the clusters to timeslots of the schedule; and
   push a firmware or software update to the vehicles according to the update schedule.

8. The apparatus as in claim 7, wherein the network connectivity data comprises charging data records (CDRs) indicative of activity of the vehicles relative to a cellular network.

9. The apparatus as in claim 7, wherein the apparatus determines the update schedule for the plurality of vehicles by:
   assigning the vehicles to timeslots of the schedule, to maximize an estimated number of vehicles that will receive the update within a predefined period of time.

10. The apparatus as in claim 7, wherein the process when executed is further configured to:
    divide the network connectivity data into a training dataset and a validation dataset;
    use the training dataset to train the machine learning-based model that models network connectivity of the vehicles; and
    use the validation dataset to validate the trained machine learning-based model.

11. The apparatus as in claim 7, wherein the process when executed is further configured to:

update the machine learning-based model using new network connectivity data.

12. The apparatus as in claim 7, wherein the vehicles are autonomous or semi-autonomous vehicles.

13. A tangible, non-transitory, computer-readable medium storing program instructions that cause a device to execute a process comprising:
- obtaining, by the device, wireless network connectivity data for a plurality of vehicles;
- clustering, by the device, the plurality of vehicles into clusters using a machine learning-based model, wherein the machine learning-based model is trained using a first subset of the network connectivity data;
- validating, by the service, the clustering of the plurality of vehicles based on an assessment of the first subset of the network connectivity data for a particular vehicle of the plurality of vehicles;
- determining that a result of the validation of the clustering fails to satisfy a threshold;
- re-training, by the service, the machine learning-based model using a second subset of the network connectivity data different from the first subset of the network connectivity data;
- clustering, by the service, the plurality of vehicles into clusters using the re-trained machine learning-based model;
- determining, by the device, an update schedule for the plurality of vehicles by assigning the clusters to timeslots of the schedule; and
- pushing, by the device, a firmware or software update to the vehicles according to the update schedule.

14. The computer-readable medium as in claim 13, wherein the network connectivity data comprises charging data records (CDRs) indicative of connectivity of the vehicles to a cellular network.

15. The computer-readable medium as in claim 13, wherein determining the update schedule for the plurality of vehicles comprises:
- assigning the vehicles to timeslots of the schedule, to maximize an estimated number of vehicles that will receive the update within a predefined period of time.

16. The computer-readable medium as in claim 13, wherein the process further comprises:
- dividing the network connectivity data into a training dataset and a validation dataset;
- using the training dataset to train the machine learning-based model that models network connectivity of the vehicles; and
- using the validation dataset to validate the trained machine learning-based model.

17. The computer-readable medium as in claim 16, wherein the process further comprises:
- updating, by the device, the machine learning-based model using new network connectivity data.

* * * * *